Aug. 5, 1952 A. N. IKNAYAN 2,606,135
METHOD OF MAKING SAFETY TYPE INNER TUBES
Original Filed Jan. 2, 1948 2 SHEETS—SHEET 1
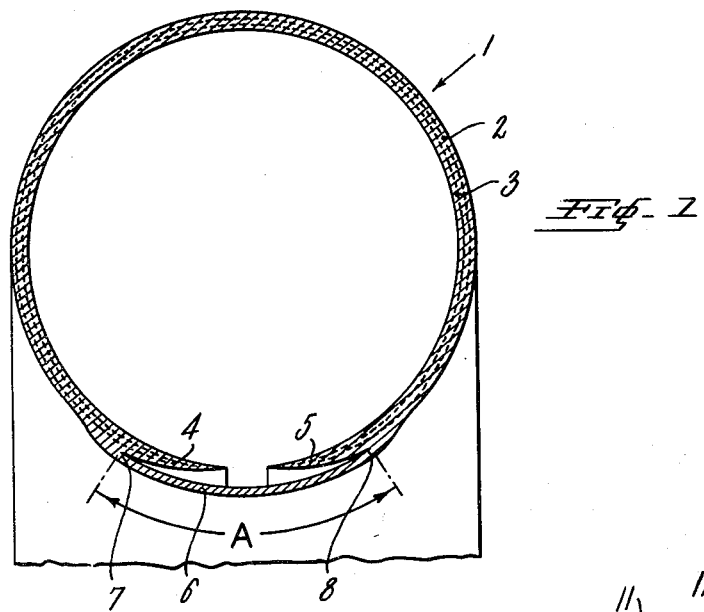
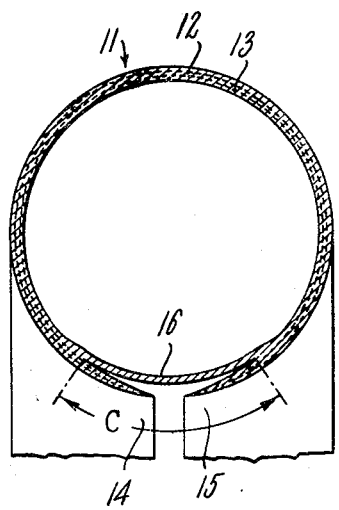
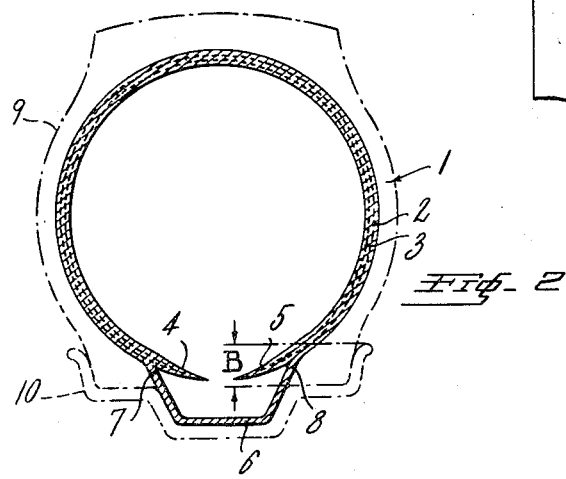
INVENTOR.
ALFRED N. IKNAYAN
BY James J. Long
AGENT Aug. 5, 1952 — A. N. IKNAYAN — 2,606,135
METHOD OF MAKING SAFETY TYPE INNER TUBES
Original Filed Jan. 2, 1948 — 2 SHEETS—SHEET 2
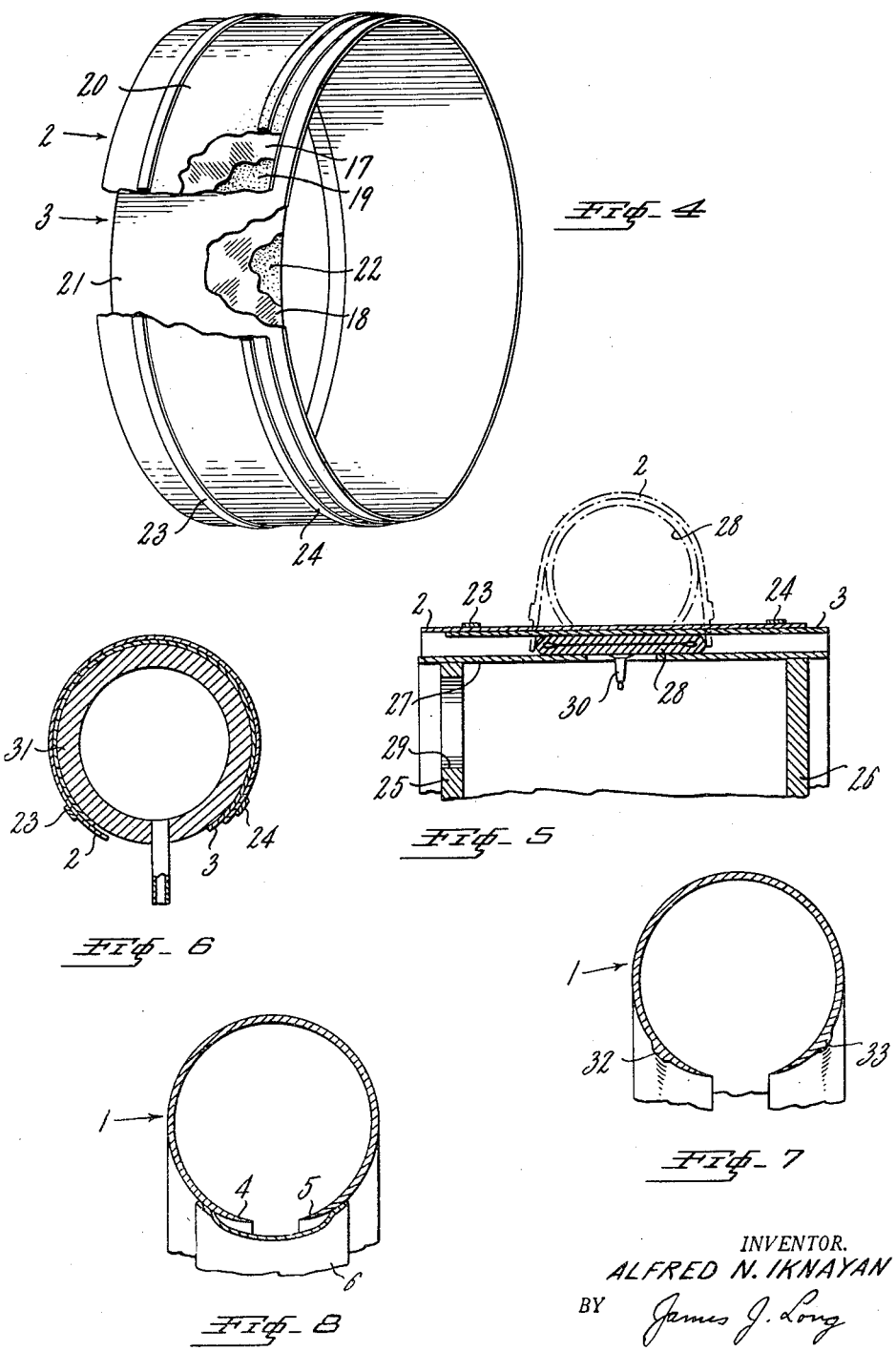
INVENTOR.
ALFRED N. IKNAYAN
BY James J. Long
AGENT Patented Aug. 5, 1952

2,606,135

UNITED STATES PATENT OFFICE 2,606,135

METHOD OF MAKING SAFETY TYPE INNER TUBES

Alfred N. Iknayan, Indianapolis, Ind., assignor to United States Rubber Company, New York, N. Y., a corporation of New Jersey Original application January 2, 1948, Serial No. 290. Divided and this application November 18, 1950, Serial No. 196,465

8 Claims. (Cl. 154—14)

This invention relates to a method of making inner tubes. More particularly, the invention relates to a method of making a safety type of inner tube in which the inner tube includes reinforcing cords for the purpose of increasing the strength and rigidity of the tube wall thereby enhancing the strength of the tire carcass with which the inner tube is associated.

This application is a division of my application Serial No. 290, filed January 2, 1948, and now abandoned.

In the operation of automotive vehicles, the hazard of blowouts and quick deflations of pneumatic tires is becoming increasingly dangerous. Due to the high speed at which automotive vehicles are driven and due to the increased horsepower of the engines for driving the vehicles, the performance expected of tires is constantly increasing. It is difficult to provide a pneumatic tire which is blowout-proof. Furthermore, tires frequently receive serious injury in their operation due to one of many causes such as using improper inflation pressures or riding over objects which produce undue distortions to the carcass. Such injuries or weak spots in the carcass are not readily apparent even upon careful inspection.

In accordance with the practice of my invention, I provide an inner tube having strain resisting elements and which is capable of fortifying a pneumatic tire so as to constitute an added reinforcement as an insurance against failure.

It is recognized that various types of safety tubes have been tried out and that even the most successful of the tubes heretofore used commercially do not provide a desired insurance against sudden deflation. It is also recognized that greater strength may be imparted to a tire carcass by providing a carcass having a greater number of plies. Such additional plies, however, are not particularly satisfactory because any rupture or break in the carcass tends to move progressively throughout the thickness of the carcass regardless of the number of plies. Consequently, an increase in carcass thickness is not the whole answer to increased protection. I have found, however, that such increased protection to the carcass may be obtained by utilizing increased plies which are separate and not united as a unit to the carcass. As a result of the use of such a separate unit, a break in the carcass may progress through the entire carcass but will not readily proceed through a separate unit which to some extent is self-adjusting within the casing and assumes its own strain resisting characteristics.

I provide an inner tube, the principal walls of which include strain resisting elements and which in combination includes an extensible portion which permits the inner tube to expand and fill out the entire chamber as defined by the interior of the tire casing and the rim with which it is associated. I have also found that the junction between the extensible portion of the inner tube and the inextensible portion must lie within a critical region relative to the tire assembly in order that the benefits of the improved tube may be attained. Still further, I have found that the junction between the extensible and inextensible portion should be located along the wall of the inextensible portion to allow free ends of the extensible portion to serve as relief for the strain resisting elements within the inextensible portion.

It is recognized that heretofore certain inner liners have been used between the tire carcass and the conventional inner tube. The present invention differs from such a construction in that it is objectionable to place a free or floating liner between the inner tube and the casing because of its tendency to creep as the tire is rotated and because it includes terminating edges which usually lie in the flexing zone of the tire and thereby causing differential movements which result in chafing and eventual failure of the inner tube.

Another object of my invention is to provide an inner tube which even in a severe break in the carcass of the pneumatic tire will tend to bridge the break and prevent a blowout. Under such conditions a tire is substantially damaged and a definite thumping noise will be apparent to the operator so that the vehicle may be stopped and the tire inspected. Under these conditions the tire remains fully inflated and may be driven substantial distances before chafing will become so extensive as to cause failure of the inner tube. After such eventuality, it has been found that the tube will still deflate slowly thus overcoming the danger of sudden deflation.

These and other objects and advantages will appear more fully in the following detailed description when considered in connection with the accompanying drawing in which:

Figure 1 is a transverse view, in section, of an inner tube made according to my invention;

Figure 2 is a transverse view, in section, of the inner tube illustrated in an inflated condition and shown in relative position with a tire casing and rim;

Figure 3 is a transverse view, in section, of an inner tube illustrating a modified form of my invention;

Figure 4 is a perspective view, partly in section, of a band of rubberized plies illustrating the first operation in the method of making the inner tube;

Figure 5 is a transverse view, in section, of a portion of an apparatus upon which the plies forming the band are shaped;

Figure 6 is a transverse view, in section, showing the shaped plies in association with a curing bag;

Figure 7 is a transverse view, in section, of the shaped plies after the curing operation; and Figure 8 is a transverse view, in section, of the cured plies shown in assembled relation with an uncured strip of rubber forming the extensible portion of the inner tube.

The walls form, in effect, a crown wall supporting the tread area of the tire casing and side walls supporting the side portions of the casing.

With reference to the drawing and in particular to Figure 1, I show an embodiment of my invention in the form of an inner tube 1 having features as hereinafter described. Essentially, the inner tube 1 comprises two plies 2 and 3 of rubberized fabric vulcanized so as to form an annulus or circular tube. In cross section, however, the walls forming the rubberized plies 2 and 3 do not form a complete circle but terminate in free ends 4 and 5 forming less than a complete circle. A rim strip 6 of rubber composition which forms, in effect, a base wall joins the walls of the plies 2 and 3 together to form a complete enclosed air chamber. The junctions 7 and 8 between the strip 6 and the outer wall of the inner tube 1 are located in spaced relation from the free ends 4 and 5 respectively. The distance of these junctions as defined by the letter "A" is equal to approximately 20% of the circumferential distance cross-sectionally around the inner tube. This distance represents a measurement taken on the inner tube when it is unmounted and inflated merely sufficiently to expand the tube to circular shape without any substantial distortion of the tube. While the distance "A" has been stated to be equal to approximately 20% of the cross sectional circumference of the inner tube, it has also been found that good results may be obtained by maintaining this dimension within a range of from 13% to 27%.

The inner tube 1 composed of the strain resisting plies 2 and 3 is intended to be of such dimensions that it will fit closely with the interior of the tire casing with which it is intended for assembly. In other words, the inner tube with slight inflation will completely fill the cavity of the tire casing without any substantial strain on the plies 2 and 3 constituting the principal portion of the inner tube 1. It is to be understood that a conventional valve assembly (not shown) is intended to be used with the inner tube and in particular in association with the rim strip 6.

Figure 2 illustrates the inner tube in assembled relation with a tire 9 and a rim 10. This tube is shown under normal operating inflation pressure. Under such conditions the rim portion 6 expands into the well of the rim 10 while the remaining portion of the tube lies against the inner wall of the casing in a substantially undistorted or unstretched condition. It will be noted in Figure 2 that the locations of the junctions 7 and 8 defining the meeting points between the rim strip 6 and the outer wall of the inner tube 1 lie in a position adjacent to the beads of the tire. Also, this junction should lie between the seat of the rim and the outer diameter of the flange of the rim. This zone is indicated by a dimension "B" in Figure 2. The reason for limiting the location of this junction is that it is essential that the strain resisting portion of the inner tube as defined by the plies 2 and 3 should extend from bead to bead of the tire and lie within that zone in which no flexing of the tire occurs while in operation. The distance represented by the letter "B" indicates this nonflexing zone.

It is also desirable that the fabric plies 2 and 3 continue beyond the junctions 7 and 8 so as to constitute the free ends 4 and 5. This is essential to eliminate an abrupt junction between the strain resisting plies 2 and 3 and the extensible rim strip 6. By forming the junctions 7 and 8, in effect, along the wall of the ply 2, it is possible to form a better attachment of the rim strip 6 to the outer wall. Furthermore, by this arrangement there is less relative movement at the junction with the result that localized strains are reduced so as to prevent failures at this location. As shown in Figure 1, the plies 2 and 2 overlap as they lie within the free ends 4 and 5. The purpose of this overlapping or offsetting is to permit a more gradual tapering of the free edges and to eliminate a more abrupt ending of the reinforcing elements.

Figure 3 illustrates a modification of my invention and shows an inner tube 11 having plies 12 and 13 of strain resisting elements constituting the principal wall of the inner tube. The walls of the tube terminate in free ends 14 and 15 at the rim region. This modification is essentially the same as that shown in Figure 1 with the exception that a rim strip 16 of extensible rubber composition is attached to the inner wall of the tube in place of the outer wall of the inner tube. Otherwise the general characteristics of the tube including the dimension "C" is the same as the corresponding features of the tube shown in Figure 1. The advantage of attaching the rim strip 16 to the inner wall of the tube is to permit the strain resisting free ends 14 and 15 to lie against the junction formed by the tire bead and the rim with which it is associated. Ordinarily, there is a slight relative movement between the tire bead and the rim while the tire is in operation. For this reason, the double wall at that junction reinforces the tire assembly at a most critical point thus reducing tire failures. Also, the free ends are not under tension and serve better to resist chafing in this locality.

An inner tube of the principal embodiment of my invention and as illustrated in Figure 1 is manufactured in accordance with the steps illustrated by Figures 4 to 8 inclusive. Figure 4 shows the make-up of the two plies 2 and 3. Essentially, these plies are formed of layers of cord fabric 17 and 18 in which the cords are spaced 35 ends per inch. Each cord is formed of plied yarn and made from nylon filaments in which the cord has a gage of .020 and having a strength of approximately 25 pounds. A cord of this kind provides a high strength while at the same time permitting the wall of the tube to be relatively thin. While cords formed of nylon are preferable, comparable results may also be obtained by utilizing other strain resisting elements such as cotton, rayon, or steel. The direction of the cords of fabric 17 and 18 are diagonal in respect to a circumferentially extending center line. More specifically, the cords lay at an angle so that after the shaping operation hereinafter described the cords will constitute an angle of approximately 45°.

In accordance with customary procedure in tire manufacture, the cord fabrics 17 and 18 are solutioned with rubber and thereafter a layer of rubber composition is applied to both surfaces of each of the fabrics 17 and 18. For example, a layer of rubber composition 19 of a gage .015 inch is applied to the underside of the fabric 17 and a layer of rubber composition 20 of a gage of .045 inch is applied to the outer side of the fabric. A layer of rubber composition 21 of .015 gage is applied to the outer side of the fabric 18 while a layer of rubber composition 22 of a .045 gage is applied to the underside of the fabric 18. With the cord fabric thus encased in layers of rubber composition, the two plies 2 and 3 are assembled together in overlapping relation and in flat band form as shown in Figure 4. The purpose of the overlapping relation is to permit a better tapering of the free edges as shown in Figure 1. To complete the band assembly, two strips or ribbons 23 and 24 are applied to the outer surface of the outer ply 2. These strips or ribbons are intended to increase the thickness of the ply at specific circumferential regions in order to serve as a buffing strip as hereinafter described.

When the two plies 2 and 3 are thus assembled, they are placed on a drum as shown in Figure 5 for the purpose of expanding the assembled layers and shaping them closely to the conformity of an annulus. The drum illustrated diagrammatically comprises end members 25 and 26 having a cylindrical cover 27. An expansible air bag 28 is positioned centrally on the drum in a deflated substantially flat condition, and the plies 2 and 3 are positioned over the drum and over the deflated air bag. A hand hole 29 through the end member 25 permits an operator to inflate the air bag by means of the air bag valve 30. As a result of the inflation, the air bag blows circular in cross-section and the assembled plies 2 and 3 are shaped as shown by the dot and dash lines. Preferably the air bag 28 includes reinforcing cords so as to better control its uniformity of expansion.

While I have shown a special means for shaping the plies 2 and 3, it is to be understood that various methods of shaping may be employed. For example, the plies may be shaped in a vacuum apparatus such as used in the conventional shaping of pneumatic tires. After allowing the assembly to be held in this expanded shape for a few moments, the air bag is deflated and the assembled plies are removed from the drum. Thereafter a flexible curing bag 31 (Figure 6) is collapsed and inserted into the partially shaped and assembled plies 2 and 3. Next the curing bag with the plies assembled thereon is placed in a vulcanizer and the plies are vulcanized. When the curing bag is removed, the plies 2 and 3 and the associated components form an integral unit constituting an annulus having a circular cross section and having open free ends in the region of the rim. This completed unit of the assembly is shown in Figure 7.

During the curing operation the strips 23 and 24 merge with the wall of the inner tube and form circumferentially extending bumps or ridges 32 and 33, respectively. The purpose of this additional material is to provide a thicker stock at this location which forms the junction to which the rim strip 6 is attached. Because the main body of the tube is vulcanized prior to its assembly with the rim strip 6, it is necessary in order to obtain good adhesion, to buff a circumferential strip as defined by the ridges 32 and 33. When the buffing operation is complete, cement is applied to that area and the rim strip 6 is assembled, with its marginal portion in contact relationship.

In order to prevent adhesion between the free ends 4 and 5 of the tube with the rim strip, that portion of the rim strip or of the free ends or both, may be coated with a non-adherent material such as soapstone or the like, thus preventing adhesion during vulcanization. In accordance with conventional practices, a valve stem (not shown) may be attached to the rim strip 6. When this operation is completed, the assembly is again placed into a mold and the tube is vulcanized. The resulting assembly is illustrated in Figure 1.

When the tube is completed, its outer appearance is not readily distinguishable from the conventional tube. Its total wall thickness is in the order of .150 inch and it may be even less than this dimension. The advantages of such a tube have been well demonstrated and the two additional plies constituting the tube itself increase the carcass strength of the tire by approximately 50%. When nylon is used as the strain resisting elements, this strength is still higher relative to the carcass. When steel cord is used in the inner tube, the strength of the tube becomes even greater than the strength of the tire carcass. Therefore, the protective value of the inner tube is evident in that it will retain the inflated condition of the tire notwithstanding complete failure of the tire itself.

Many tests have been made to determine the practicability and performance of the inner tube made in accordance with my invention. For example, in one of these tests an inner tube was mounted in a 6.50-16 tire casing having a rupture extending through the tire carcass in the form of a letter X and the size of the rupture was 2½ inches by 2 inches. This tire was driven a distance of 96 miles before the operator became aware of a bumping of the tire. The vehicle was driven at the rate of 70 miles per hour on a paved road. At 117 miles the tire started to throw its tread and at this point the tube failed and the deflation of the tube was sufficiently slow to permit the vehicle to be easily handled until reaching a complete stop. An inspection of the tire showed that a fabric break extended 2 inches above the bead around the tread of the tire and to a point 2 inches above the opposite bead. Attempts have been made to repeat this test using conventional inner tubes and using a similar ruptured casing having a break size of 2½ inches by 2 inches. The tire ran only 34 miles before the tube failed completely and without warning causing the vehicle to swerve badly. An inspection of the tire showed that the size of the rupture had increased to 3 inches by 2 inches.

In order to show the advantages of the present tube in connection with its puncture resisting characteristics, a tire having a tube of my invention was punctured by forcing into the casing and through the tube a nail of a diameter of .134 inch. This tire was driven a distance of 330 miles at from 45 to 50 miles per hour without failure and without loss of air. Similar tests were conducted using nails having diameters of .148, .164, .209, .229, .248 and .265. In each case the tires were driven a distance of 330 miles without failure or deflation of the inner tubes. Using a conventional inner tube and with a nail of the size .134 driven into the tire and through the inner tube, the tube was completely deflated after driving the vehicle 19 miles.

A number of other tests have been conducted and in each case the superiority of the inner tube of my invention has been demonstrated to be much greater in resistance to punctures and in its capability of supporting a damaged casing with its subsequent beneficial result to the protection of the tire casing and inner tube and to the vehicle and its occupants.

As thus shown and described, it is believed that a novel tube has been produced which in appearance and use is substantially the same as that of a conventional inner tube yet which serves as a safety factor for the vehicle and for its occupants throughout a wide range of failures of the tire carcass.

While reference is made to rubber and rubber compositions, it is to be understood that the invention contemplates synthetic rubber as well as natural rubber. By synthetic rubber I refer to those modified butadiene-1,3-derived rubber materials which lie within the class of neoprene (polychloroprene), Buna S (rubber copolymer of butadiene-1,3 and styrene), and Buna N (rubbery copolymer of butadiene-1,3 and acrylonitrile), Butyl (rubbery copolymer of a major proportion of a monolefine, e. g., isobutylene, with a minor proportion of a conjugated 1,3-diene, e. g., isoprene).

Having thus described my invention, what I claim and desire to protect by Letters Patent is:

1. The method of making inner tubes comprising the steps, forming a flat annular band of a plurality of rubberized plies of strain resisting elements, shaping the band to form a partially circular shape in cross-section, vulcanizing the shaped band, and attaching an extensible strip of rubber composition to the edge portions of the shaped band to form an enclosed chamber.

2. The method of making inner tubes comprising the steps, forming a flat annular band of a plurality of rubberized plies of strain resisting elements, shaping the band to form a partially circular shape in cross-section, vulcanizing the shaped band, and attaching an extensible strip of rubber composition to the shaped band at a point spaced from the marginal edges of the band to allow free edge portions of the band to extend beyond the junction formed between the band and the extensible strip.

3. The method of making inner tubes comprising the steps, forming a flat annular band of a plurality of rubberized plies of strain resisting elements, locating one of said plies in off-set relation to its adjacent ply for constituting tapered edges, shaping the band to form a partially circular shape in cross-section, vulcanizing the shaped band, and attaching an extensible strip of rubber composition to the edge portions of the shaped band to form an enclosed chamber.

4. The method of making inner tubes comprising the steps, forming a flat annular band of a plurality of rubberized plies of strain resisting elements, attaching a ribbon of rubber composition to one of the exposed surfaces of the plies at a point spaced from the marginal edge of the ply, shaping the band to form a partially circular shape in cross-section, vulcanizing the shaped band, and attaching an extensible strip of rubber composition to the band at the region of the ribbon to form an enclosed chamber.

5. The method of making inner tubes comprising the steps, forming a flat annular band of a plurality of rubberized plies of strain resisting elements, attaching a ribbon of rubber composition to one of the exposed surfaces of the plies at a point spaced from the marginal edge of the ply, shaping the band to form a partially circular shape in cross-section, vulcanizing the shaped band, buffing that region of the shaped band upon which the ribbon is located, and attaching an extensible strip of rubber composition to the band at the region of the ribbon to form an enclosed chamber.

6. The method of making inner tubes comprising the steps, forming a flat annular band of a plurality of rubberized plies of strain resisting elements, attaching a ribbon of rubber composition to one of the exposed surfaces of the plies at a point spaced from the marginal edge of the ply, shaping the band to form a partially circular shape in cross-section, vulcanizing the shaped band, buffing that region of the shaped band upon which the ribbon is located, attaching an extensible strip of rubber composition to the band at the region of the ribbon to form an enclosed chamber, and vulcanizing the extensible strip of rubber composition.

7. The method of making inner tubes comprising the steps, forming a flat annular band of a plurality of rubberized plies of strain resisting elements, shaping the band to form a partially circular shape in cross-section, vulcanizing the shaped band, attaching an extensible strip of rubber composition to the shaped band at a point spaced from the marginal edges of the band to allow free edge portions of the band to extend beyond the junction formed between the band and the extensible strip, treating the free edge portions to prevent adhesion between the free edge portions and the shaped band, and vulcanizing the extensible strip of rubber composition.

8. The method of making inner tubes comprising in combination the steps of forming a flat annular band of a plurality of rubberized plies of strain-resisting elements, disposing said band over an inflatable collapsed curing bag, inflating the bag to expand and shape the band to form a partially circular shape in cross-section, vulcanizing the shaped band on said curing bag, removing said curing bag, attaching an extensible strip of vulcanizable rubber composition to the edge portions of the shaped vulcanized band to form an enclosing chamber, and vulcanizing the extensible strip of rubber composition.

ALFRED N. IKNAYAN.

REFERENCES CITED

The following references are of record in the file of this patent:

UNITED STATES PATENTS

| Number | Name | Date |
|---|---|---|
| 836,772 | Marks | Nov. 27, 1906 |
| 1,657,052 | Webster | Jan. 24, 1928 |
| 1,818,710 | Hannon | Aug. 11, 1931 |
| 2,231,182 | Eger | Feb. 11, 1941 |
| 2,338,235 | Eger | Jan. 4, 1944 |